Nov. 1, 1960     J. J. SMITH     2,958,404
AIRCRAFT ANCHOR
Filed April 25, 1958     2 Sheets-Sheet 1
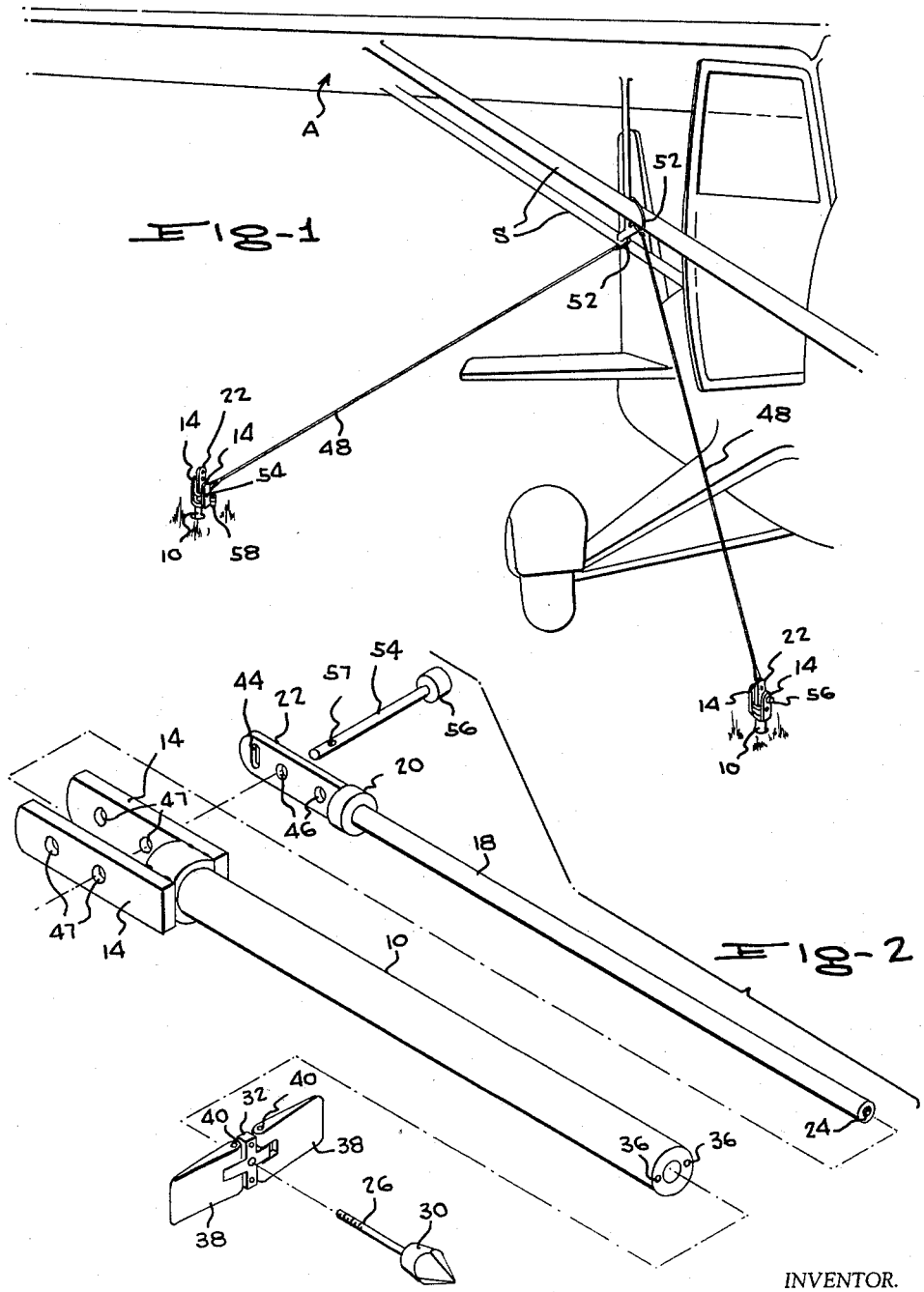
INVENTOR.
JOHN J. SMITH
BY
McMorrow, Berman & Davidson
ATTORNEYS Nov. 1, 1960
J. J. SMITH
2,958,404
AIRCRAFT ANCHOR
Filed April 25, 1958
2 Sheets-Sheet 2
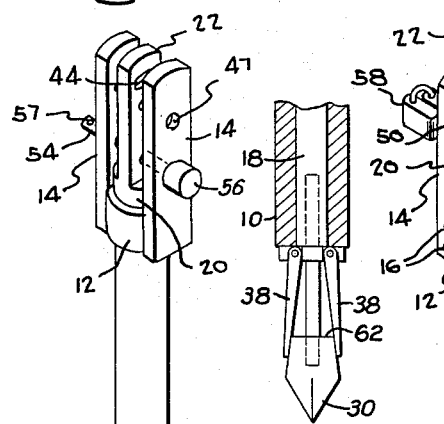
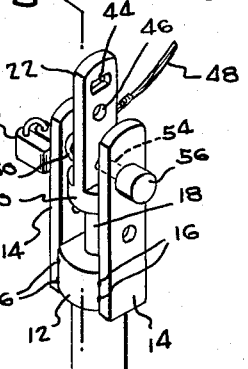
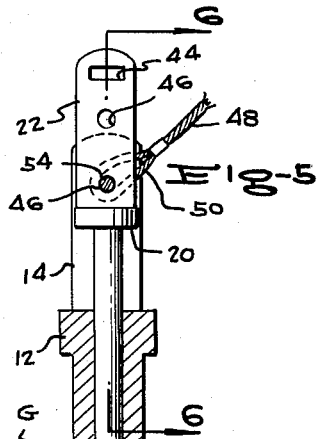
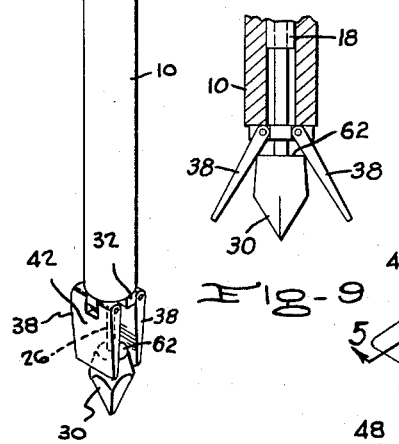
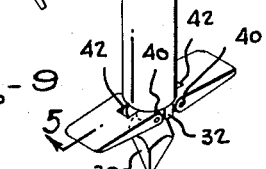
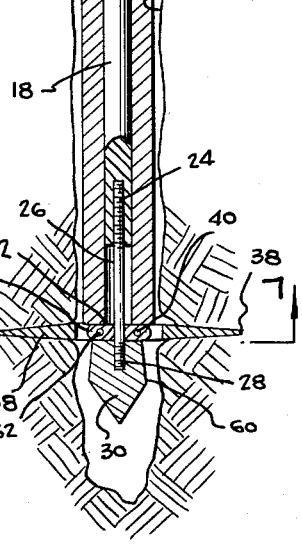
INVENTOR.
JOHN J. SMITH
BY
McMorrow, Berman & Davidson
ATTORNEYS

United States Patent Office 2,958,404
Patented Nov. 1, 1960

2,958,404

AIRCRAFT ANCHOR

John J. Smith, 72976 W. Sullivan Road,
Twentynine Palms, Calif.

Filed Apr. 25, 1958, Ser. No. 731,057

2 Claims. (Cl. 189—92)

This invention relates generally to anchoring devices, and more particularly has reference to a combination anchoring and anti-theft device for aircraft.

Considerable damage has been done to aircraft on the ground, by reason of the fact that the aircraft have not been securely tied down. As a result, unexpected storms, heavy winds, etc., have caused the aircraft to tear loose from their moorings and be overturned, often with serious damage thereto.

In addition, it is not uncommon for an aircraft to be stolen by reason of the fact that efficient anti-theft protection therefor has not existed.

The main or broad object of the present invention is to provide an improved anchor and anti-theft device, which will eliminate the danger, to the maximum extent, of the aircraft being damaged by the elements when moored, and which will at the same time largely eliminate the possibility of the aircraft being stolen or in any way used by an unauthorized individual.

A more particular object is to provide an improved device of the character stated which will be designed for manufacture at low cost, but which will nevertheless be fully efficient for its intended purposes.

Still another object is to so design the portable anchor as to permit it to be made in any of various sizes without changes in the basic design, thus to permit it to be used in association with airplanes of various sizes.

Still another object is to provide a combination anchor and anti-theft device for aircraft that will be capable of being swiftly engaged in the ground, but which will at the same time impart maximum resistance to unauthorized extraction of the device from the ground.

Still another object is to so form the head portion of the device that it will be adapted to be swiftly and easily connected to a tethering cable, with the cable receiving portion of the device being lockable by a conventional padlock, in an arrangement such that the cable will be securely anchored both to the device and to the plane to provide a strong mooring for the aircraft, that cannot be removed by any unauthorized individual.

Still another object is to form the device in such a manner that it will be light, though possessed of considerable strength, will be compact, and will be capable of swift assembly or disassembly.

Other objects will appear from the following description, the claims appended thereto, and from the annexed drawings, in which like reference characters designate like parts throughout the several views, and wherein:

Figure 1 is a fragmentary perspective view of an airplane anchored by a pair of the devices constituting the present invention;

Figure 2 is an enlarged, exploded perspective view of one of the devices per se;

Figure 3 is a perspective view on the same scale as Figure 2 of the assembled device as it appears when ready for insertion into the ground;

Figure 4 is a perspective view on the same scale as Figure 3 showing the device with the anchoring cable attached and the flukes open;

Figure 5 is a still further enlarged longitudinal sectional view substantially on line 5—5 of Figure 4 with the device engaged in the ground;

Figure 6 is a longitudinal sectional view on the same scale as Figure 5, taken substantially on line 6—6 of Figure 5; and Figure 7 is a transverse sectional view substantially on line 7—7 of Figure 5.

Figure 8 is a fragmentary view of the head and fluke structure of Figure 5, but with the flukes in the collapsed or folded position;

Figure 9 is a fragmentary view of the head and fluke structure of Figure 5, but with the flukes in the partially extended position.

Referring to the drawings in detail, the device constituting the present invention is so designed that a plurality of them would be used for anchoring and preventing the theft of a single aircraft. In a typical arrangement three of the devices may be employed, in association with the aircraft, but of course, the number and arrangement can be varied according to the particular aircraft and the needs of the particular situation.

In any event, each device includes an elongated, straight, tubular housing 10 integrally formed at its upper end with a collar 12 having diametrically opposed flat surfaces to which upwardly projecting, parallel, wide fork arms 14 are fixedly secured by welds 16 or their equivalent. Axially shiftable in the bore of housing 10 is an elongated plunger or stem 18, the upper end of which projects above collar 12 between arms 14, and is formed with a flat head 20 integral or otherwise made rigid with an upwardly projecting, wide, elongated locking plate or tongue 22.

At its lower end, plunger 18 has an axial, threaded, deep recess 24 in which is threadably engaged the inner end of a small diameter connecting rod 26, the outer end of which is threadedly engaged in a threaded axial recess 28 of a pointed head 30 disposed beyond the lower end of housing 10.

A cruciform fluke support plate 32 (see Figure 7) has diametrically opposed openings receiving connecting screws 34 threadedly engaged (see Figure 2) in diametrically opposed threaded recesses 36 formed in the inner end of housing 10. A pair of identical but opposite flukes 38 are disposed at opposite sides of plate 32, and at their inner ends have transverse bores receiving hinge pins 40 passing also through diametrically opposed transverse openings of plate 32. The hinge pins 40 extend across inner end notches 42 of flukes 38, in which notches the hinge-pin-receiving arms of plate 32 are loosely positioned.

Flukes 38 are progressively reduced in thickness in a direction toward their distal ends as shown in Figure 5, so as to have a blade-like formation designed to facilitate the engagement of the same in the ground G and designed, further, to facilitate insertion of the device in hole H (see Figure 5) when the device is in its Figure 3 condition, that is, with the flukes folded.

Adjacent the upper end of locking plate or tongue 22 there is formed a transverse slot 44 and spaced longitudinally of tongue 22 from slot 44 are apertures 46 adapted to be registered with openings or apertures 47 (see Figure 3) formed in arms 14.

Cables 48 are shown in Figure 1, said cables at one end being formed with loops 50 (see Figure 5) and being formed at their other ends with loops 52 adapted to be looped about the struts of an aircraft A. Obviously, the cables could be connected to any selected portion of the aircraft found suitable for this purpose. The loop 52 could be formed in the cable, and the cable could be attached to the struts by extending the looped ends about the struts or other structural members of the airplane, after which the length of the cable could be extended through loop 52, with the loop 50 then being disposed between tongue 22 and one of the arms 14. A locking pin 54, having at one end a head 56, is then extended through selected registering openings 46, 47, and formed in the end of the pin remote from end 56 is a small opening 57 adapted to receive the hasp of a conventional padlock 58.

Of course, various other cable arrangements may be employed, and in addition, each cable may have a take-up loop, not shown, intermediate its ends, so that whenever necessary all slack can be taken out of the cables when the anchors are properly placed. This is considered sufficiently obvious as not to require special illustration herein.

In use of the device, ordinarily the device may be maintained in a disassembled condition, or for that matter, in a fully assembled condition ready for use. A number of the devices could be kept in a strong canvas bag, having a draw rope, which bag would be adapted for storage in a small area within the airplane. The anchors could, of course, be made in any size, and larger aircraft would obviously require larger anchors. Still further, the material of the anchors can be varied, but in a preferred embodiment, the housing, plunger, and locking pin could be made of a cast, hardened aluminum, with the flukes and the ground penetrating head 30 being of stainless steel, suitably hardened or tapered. The cables would also be of a non-corrosive steel to prevent their being cut by unauthorized individuals and to prevent, further, any tendency of the same to break in a strong wind.

In any event, in use of the device it would initially appear as in Figure 3. A suitable auger, not shown, which could be of a T-shape with a suitable cutting head, would be included with a set of anchors, so that wherever necessary, one may form in the ground a deep hole H. Thereafter, the device with the flukes folded as in Figure 3 is inserted in the hole. At this time, plunger 18 is shifted downwardly within housing 10 to its maximum extent, with head 20 bearing against collar 12 as in Figure 3, and with tongue 22 aligned transversely with the arms 14. To prevent relative axial displacement of the plunger and housing at this time, locking pin 54 is temporarily extended through selected openings of the tongue and fork arms.

Then, with the device fully inserted, the pin 54 is removed and housing 10 is shifted downwardly along the plunger 18. Referring now to Figures 3 and 5, diametrically opposed, downwardly divergent cam surfaces 60 are formed on head 30, adjacent the pointed tip. The cam surfaces are so disposed that when housing 10 is moved downwardly along plunger 18 from its Figure 3 to its Figure 4 position, the cam surfaces will bias the blades outwardly, and simultaneously, as the flukes move outwardly from their Figure 3 toward their Figure 4 or 5 positions, the inner end surface 62 of head 30 will bear against the under sides of the inner ends of the flukes, causing the flukes to be clamped in their Figure 5 positions between head 30 and the lower end of housing 10, when tongue 22 is longitudinally offset from arms 14 to an extent such as to locate the innermost opening 46 of tongue 22 in registration with the outer openings 47 of fork arms 14. The flukes thus embed firmly in the ground, and now, the locking pin is inserted once again, in its Figure 4 or Figure 5 position, with loops 50 being disposed as shown in Figure 5. On application of padlock 58, the cable is fully locked both to the aircraft and to the anchor, and of course, as previously noted, the anchor is firmly embedded in the ground and cannot subsequently be withdrawn until the padlock 58 is removed and pin 54 is also removed, and plunger 18 and housing 10 are brought back to their initial, Figure 3 positions to fold the flukes.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. An anchor and anti-theft device for an aircraft, comprising an elongated, tubular housing adapted for extension into the ground, said housing having an axial bore opening upon both ends of the housing; a pair of flukes pivotally connected to the housing at one end thereof for swinging movement between normal, collapsed positions and operative, laterally projecting positions, said flukes in the laterally projecting positions thereof being adapted for engaging in the ground to prevent removal of the housing from the ground; an elongated plunger axially slidable in the housing and projecting beyond the other end of the housing; a head secured to the plunger for axial movement therewith, said head having diametrically opposed cam surfaces disposed for biasing the flukes to their laterally projecting positions responsive to shifting of the plunger in one direction within the housing to one position; a pair of fork arms rigid with said other end of the housing and spaced apart with the plunger extending therebetween, said fork arms having longitudinally spaced openings formed therein; a tongue rigid with the plunger in the space between the fork arms and having longitudinally spaced openings, one opening of the tongue registering with one opening of the fork arms in said one position of the plunger, another opening of the tongue registering with other openings of the fork arms in a second position of the plunger in which the flukes are collapsed with the head out of engagement with the flukes; a locking pin extending transversely of the tongue and fork arms and engageable in registered openings of the tongue and fork arms in each of said positions of the plunger, said locking pin having an opening at one end thereof adapted for receiving a padlock to prevent removal of the locking pin from selected, registered openings of the tongue and fork arms in which the locking pin is disposed, and a cable adapted for connection between the locking pin and said aircraft, said cable being formed with a loop at least at one end thereof receiving the locking pin in the space between the tongue and one of the fork arms.

2. A ground anchor comprising: a housing and a plunger connected for relative longitudinal movement; a head secured to one end of the plunger beyond one end of the housing, said head being formed with cam surfaces extending obliquely to the lengths of the housing and plunger; flukes pivotally connected to the housing at said one end thereof for movement by the cam surfaces from inoperative positions extending longitudinally of the housing and plunger, to operative positions extending laterally outwardly from the housing in perpendicular relation thereto, responsive to relative longitudinal movement of the housing and plunger in one direction; a tongue and an arm on the other ends of and extending longitudinally of the housing and plunger respectively, said tongue and arm being transversely spaced and having openings registering upon relative longitudinal movement of the housing and plunger in said direction to an extent sufficient to operatively position the flukes; a locking pin removably, snugly engageable in the registering openings and extending across the space between the tongue and arm; and an anchoring cable adapted for connection to an object to be anchored, and formed with a loop receiving the pin within said space, said pin when extended within the registered openings being engaged thereby against any movement of the pin longitudinally of each of the housing and plunger respectively.

References Cited in the file of this patent

UNITED STATES PATENTS

| | | |
|---|---|---|
| 1,214,679 | Hindmarsh | Feb. 6, 1917 |
| 1,470,005 | Hagan | Oct. 9, 1923 |
| 2,176,566 | Dillon | Oct. 17, 1939 |
| 2,357,368 | Warren | Sept. 5, 1944 |
| 2,616,666 | Honey | Nov. 4, 1952 |